Sept. 1, 1959    H. T. H. CARLSSON    2,902,606
ALTERNATING CURRENT GENERATORS, ESPECIALLY
FOR AUTOMOTIVE VEHICLES
Filed July 1, 1958

United States Patent Office 2,902,606
Patented Sept. 1, 1959

2,902,606

ALTERNATING CURRENT GENERATORS, ESPECIALLY FOR AUTOMOTIVE VEHICLES

Hans Thorsten Henrik Carlsson, Halmstad, Sweden

Application July 1, 1958, Serial No. 746,018

Claims priority, application Sweden July 9, 1957

3 Claims. (Cl. 307—10)

The invention relates to alternating current generators particularly to generators which are to be used especially for generating current for the ignition and lighting systems in automotive vehicles and which comprise a rotor having two pairs of poles and a stator having two magnet cores which are adapted to bridge simultaneously each its pair of two adjacent poles. In known generators of this kind ignition current is generated in a coil on one magnet core and lighting current in a coil on the other core. In those cases when a third coil is required, for instance for generating charging current or for attaining a higher lighting power, a third magnet core and a third pair of poles may be arranged in a similar manner so that three magnet circuits independent of each other are obtained. Such a device involves, however, a corresponding increase in the dimension of the generator which is a disadvantage, especially in motor cycles. It is previously known to arrange a third coil with a core within the available space between two cores. The third core is then magnetically connected to the adjacent ends of the two other cores. In such an arrangement of the magnetic circuits, however, no magnetic flux would be obtained in the third core when the two other coils are currentless. When on the other hand the coils last mentioned are energized a counter electromotive force is generated which counteracts the magnetic field in these coil cores so that a magnetic flux having sufficient strength may be formed in the third coil core. According to the invention means are provided to ensure the necessary magnetic flux through the ignition coil under all operating conditions, including conditions when the lighting current is broken. For this purpose the third coil is adapted to generate the ignition current, while the two other coils are used for generating the lighting current. Means provided for connecting the last mentioned two coils alternatively either to the lighting circuits or, upon disconnecting the lighting, to a compensating load corresponding thereto, so that the lighting coils always remain excited during operation with no appreciable change in the current load of said lighting coils. By maintaining the lighting coils in a current-carrying condition, a magnetic resistance is maintained in the associated magnetic circuits, which enables the necessary magnetic flux to be formed in the third coil core for generating the ignition voltage.

Figure 1:
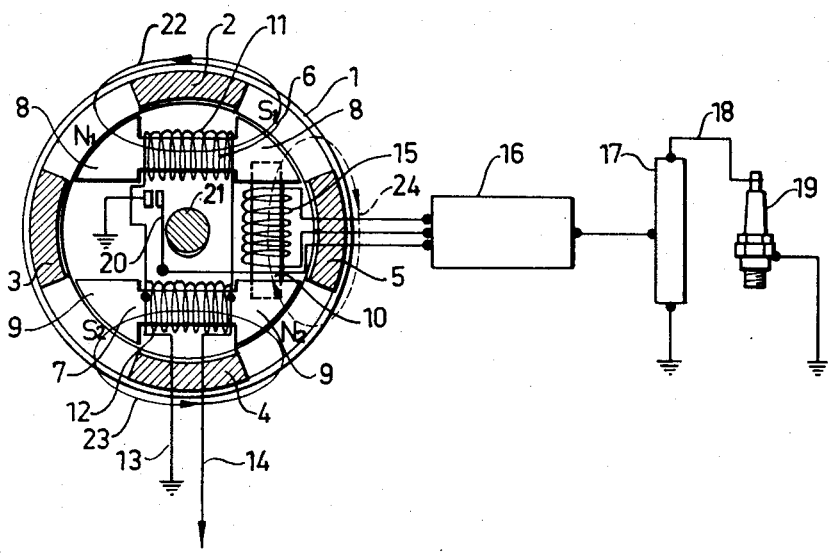
Figure 2:
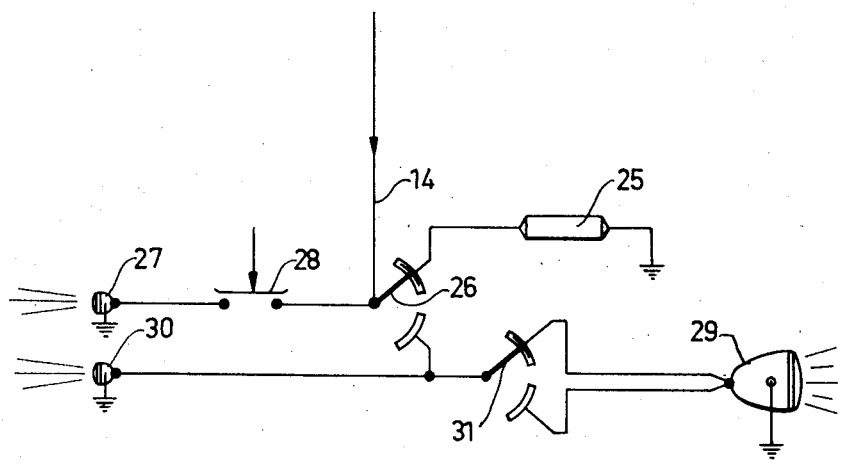

The invention will be more fully described with reference to the attached drawing, wherein:

Figure 1 shows an alternating current generator with its associated ignition current circuit; and Figure 2 is a circuit diagram of the lighting current circuits.

The alternating current generator is of the type usually termed flywheel magneto. It comprises an annular rotor 1 having two pairs of poles $N_1$, $S_1$ and $N_2$, $S_2$ and four permanent magnets 2, 3, 4, 5 disposed between these poles. The generator further comprises a stator composed of two magnet cores 6, 7 having pole pieces 8, 9 arranged in such a way that they bridge simultaneously a corresponding pair of poles of the rotor. According to the invention, a third magnet core 10 is disposed between adjacent ends of the first mentioned magnet cores, said third core being magnetically connected to the corresponding pole pieces 8, 9. In order to attain a good magnetic contact, a laminated core 10 is dovetailed into the pole pieces of the likewise laminated magnet cores 6, 7 in such a way that the laminations overlap. All magnet cores are rigidly assembled on a stationary support member, not shown in the drawing.

The magnet cores 6, 7 each carry a winding 11 and 12, respectively, which are connected in parallel and to a lead 13, which is grounded and a lead 14 which is a feeder to a lighting system later herein discussed. The third magnet core 10 is provided with a winding 15 which is connected to an impulse changing device 16 in which current impulses generated in the coil 15 are converted into direct current impulses which are transformed in a transformer 17 into high-tension impulses which by way of a lead 18 are transmitted to a spark plug 19. In the impulse current circuit of the ignition system there is provided an interrupter contact 20, which in known manner is actuated by a cam 21 on the rotor shaft.

As the poles $N_1$, $S_1$, $N_2$, $S_2$ of the rotor are passed during the rotation past the pole pieces 8, 9 of the magnet cores, magnetic circuits are completed through the magnet cores 6, 7, said circuits being indicated in the drawing by solid lines 22 and 23, respectively. In addition, magnetic flux is obtained through the third magnet core 10 as indicated by a broken line 24. The last mentioned magnet flux can be formed only on condition that lighting coils 11, 12 are excited. As a matter of fact, when the lighting current circuit is broken and the coils are dead, those magnetic fluxes through the core 10 which have a tendency to form between, on the one hand, the poles $N_1$, $S_2$, that is $N_1$—6—10—7—$S_2$, and, on the other, the poles $S_1$, $N_2$, that is $S_1$—10—$N_2$, will neutralize each other. This balance between two opposed fluxes is upset, however, when the lighting current circuit is closed and the coils 11, 12 are carrying a current. The fact is that the currents induced in the coils then generate magnetic fields which are opposed to the original magnetic fields, which results in an increase of the magnetic resistance of the circuit $N_1$—6—10—7—$S_2$ so that in circuit 24 a resultant field is obtained which is sufficient to generate the ignition voltage.

According to the invention, special steps are taken in order to ensure a field, necessary for the ignition voltage, in the core 10 of the coil, even when the lighting coils 11, 12 are dead. For this purpose a compensating resistance 25, Fig. 2, is arranged to be automatically cut into the circuit of the lighting coils by way of the lead 14 when the lighting is disconnected by a switch 26 being switched over. Suitably said resistance is adjusted in such a way that the generator will operate under the same conditions, when the lighting is switched on as well as switched off. As shown in Fig. 2, the connection and disconnection of brake lights is adapted to be carried out independent of what position switch 26 has for the moment. Thus, the brake lamp 27 is connected directly to the lead 14 by the brake contact 28. When the switch 26 is switched over in order for the lighting to be switched on, the compensating resistance 25 is disconnected and headlights 29 and tail-lights 30 are cut in, the former by way of a switch 31 for the purpose of switching over from full light to dim light.

The compensating resistance 25 may be replaced by a charging device for charging a battery or another useful load.

I claim:

1. In a vehicle having an ignition circuit and lighting circuits an alternating current generator arrangement for generating current for the ignition and lighting current circuits comprising, a rotor having two pairs of poles, a stator provided with two coils-carrying magnet cores disposed so that each bridges simultaneously a corresponding pair of adjacent pair of poles of the rotor, said stator further including one other coil-carrying magnet core disposed between corresponding ends of the two first mentioned magnet cores and magnetically connected thereto, for each coil-carrying core a coil formed thereon, electrical connections between the coil on said other core and the ignition circuit, and means electrically connected to the two coils on the two first mentioned cores and selectively operable to alternatively connect one of the lighting circuits to said two coils and a compensating load corresponding substantially to a load corresponding to the last mentioned lighting circuits thereby to constantly keep current flow through said two coils when the vehicle is in operation.

2. In a vehicle according to claim 1, in which said means selectively operable to alternatively connect one of the lighting circuits and the compensating load comprises a selectively operable switch.

3. In a vehicle according to claim 1, including means to selectively connect to said two coils a lighting circuit other than said one lighting circuit while the compensating load is connected thereto.

No references cited.